United States Patent [19]

Cailliot

[11] 4,278,201
[45] Jul. 14, 1981

[54] CONTINUOUS CENTRIFUGAL SEPARATOR

[76] Inventor: Serge Cailliot, 38, Rue du Bois de Boulogne, 9220 Neuilly-sur-Seine, France

[21] Appl. No.: 49,386

[22] Filed: Jun. 18, 1979

[30] Foreign Application Priority Data

Jun. 19, 1978 [FR] France ............................. 78 18312

[51] Int. Cl.³ .............................................. B04B 1/00
[52] U.S. Cl. .................................................... 233/27
[58] Field of Search .................. 233/27, 1 R, 1 E, 28, 233/29, 30, 31, 34, 35, 36, 37, 38, 39, 40, 41, 42, 43

[56] References Cited

FOREIGN PATENT DOCUMENTS 691923  6/1940  Fed. Rep. of Germany ............. 233/27

Primary Examiner—Stanley N. Gilreath
Attorney, Agent, or Firm—Owen, Wickersham & Erickson

[57] ABSTRACT

A continuously renewing separator with a rotating cylindrical wall of the type comprising a helicoidal winding with closely adjacent turns of an endless belt which is looped about itself so as to unwind slowly at one end and rewind at the other end while advancing axially at the same time as it is drawn into continuous rotation at a greater speed. The belt is disposed in a rotating first cage turning at the great speed and comprising on the one hand a device for supporting and guiding the cylindrical part with adjoining turns, progressive unwinding and rewinding guides located fixedly in said cage and a slow and continuous drive means for the belt in relation to said cage. The supporting and guiding device, as well as the drive means are constituted at the same time by a second cylindrical cage coaxial with the first cage and comprising equidistant bars which are integral with and project inside two continuous terminal drumheads. The belt comprises exterior notches cooperating with the projecting portion of said bars to insure engagement and the second cage is driven at a speed which is slightly different from that of the first cage.

4 Claims, 6 Drawing Figures

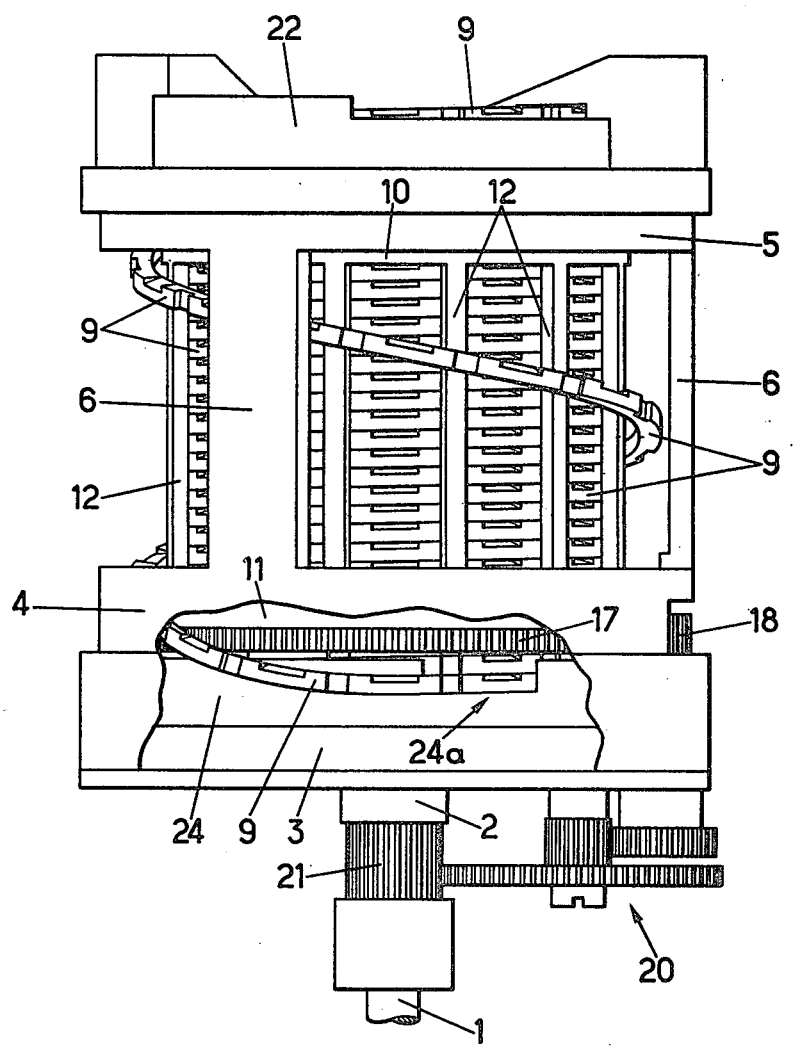
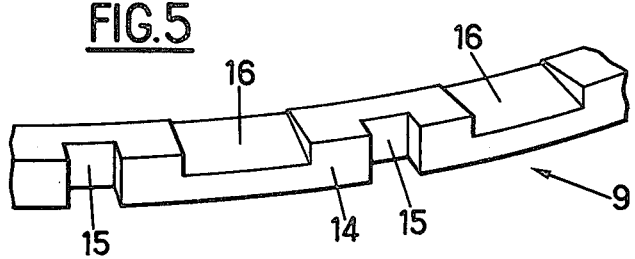

CONTINUOUS CENTRIFUGAL SEPARATOR

BACKGROUND OF THE INVENTION

The invention relates to continuously renewing separators having a cylindrical revolving wall of the type comprising a helicoidal winding with closely adjacent turns of an endless belt which is looped about itself so as to unwind slowly at one end and rewind at the other end while advancing axially at the same time as it is drawn into continuous rotation at a greater speed.

According to German patent No. 691,923, this type of centrifuge is known in which the endless belt is a flat perforated band, the helicoidal winding being disposed inside a rotating cage whose bars turn about themselves, the renewing entrainment of the band being insured by the return loop proper which passes through the inside of the cylindrical winding and winds onto a central capstan which is coaxial with the cage. Drive of this band is thus insured both by friction and by traction of the return side, which is a serious disadvantage in that it does not allow a correct drive. In fact, in the principal cylindrical winding, the band traction from the inside is transmitted unsatisfactorily since this winding is supported on the inside by the cage equipped with rotating bars. However, it is inappropriate to provide rotating bars in the interior because they will interfere with centrifuged solid products.

Important progress has been achieved by French patent No. 2 372 658, or European Patent No. 0 000 004 with regard to the type of drive of the endless band. Here, the drive is insured again by friction, but also by direct action on the cylindrical part which is achieved by entraining the bars directly into rotation by an appropriate mechanism, adherence being achieved quite naturally by the centrifugal force. In this case, no action is exerted on the return loop which thus can be a natural free loop of any trajectory, for example, outside the cylindrical wall. Another important progress also achieved by the above mentioned prior patent, comprises replacing the flat perforated band by a solid belt without perforations and which is chamfered, non-wraping and easy to clean. However, this device requires a reducer with multiple outlets, and the rotating bars which are of small diameter and great length are subjected to alternate rotational deflection because of the centrifugal force which limits the maximum speed at which the device can rotate. Further, serious problems may arise from the point of view of expansion when the belt is made of a material which expands more than does the cage and when the apparatus functions under heat conditions, for example in the treatment of coffee. In fact, in this case the winding with closely adjacent turns totals a great length of belt, and the accumulated differential expansion of this belt in relation to the cage is reflected exclusively in the return loop which thus undergoes substantial variations. The latter are tolerated by the free mounting of this loop, as explained above, but they cause considerable obstruction of the rotating assembly and are an additional reason for limiting the speed under heat conditions.

SUMMARY OF THE INVENTION

The object of the present invention is to provide an endless centrifugal separator which eliminates the above disadvantages, that is, one that is mechanically simpler and more robust and which further does not cause accumulated expansion in the return loop.

For this purpose, the belt is disposed in a cage rotating at high speed and comprising, on the one hand, a device for supporting and guiding the cylindrical part with closely adjacent turns and, on the other hand, progressive guides for unwinding and rewinding, fixedly disposed in said cage, the same as in known devices and also, with means for slow and continuous drive of the belt in relation to said support. However, in accordance with the invention, said device for supporting and guiding the cylindrical part of the belt with closely adjacent turns as well as said means for driving said belt are constituted at the same time by a second cylindrical cage coaxial with the first cage and comprising equidistant bars which are integral with two continuous terminal drumheads and which project inside these drumheads, while the belt comprises exterior notches cooperating with these bars to insure engagement, said second cage being driven at a speed which is slightly different from that of the first cage.

One of the two cages may be integral with a drive shaft mounted on bearings while the second cage is rotatably mounted in the first one and is driven in a slow differential movement by a reducer driven from a coaxial pinion which is immobile or immobilizable.

In the case where the return loop of the belt comprises a natural free loop passing through the outside of the helicoidal winding having closely adjacent turns, said first cage comprises the progressive unwinding and rewinding guides which are integral with the drive shaft. The second cage containing the bars for supporting and engaging the belt is in the form of a sleeve open at both ends with a toothed driving rim on the side of said shaft. A pinion is provided whose slow rotation is insured by a reducer contained in the first cage acting on said toothed rim. Said sleeve is rotatably mounted in the second cage by means of two bearings in the form of rims, each comprising a notch for passage of the return loop which bypasses the two outside edges of said sleeve and said toothed rim so as to pass into the space between the two cages.

Further, as in the preceding example, the belt has a solid quadrangular cross-section with notches in the contact surface with the adjacent turn widening toward the inside and intercalated with the engaging pinions.

Other details of the invention will appear in the following description of an embodiment given by way of example and shown in the attached drawings.

BRIEF DESCRIPTION OF THE DRAWING

FIG. 2 is an outside view with the rotating part of the apparatus partially broken away;

FIG. 5 is a perspective view on an enlarged scale of a fragment of the belt.

DETAILED DESCRIPTION OF EMBODIMENT

Figure 1:
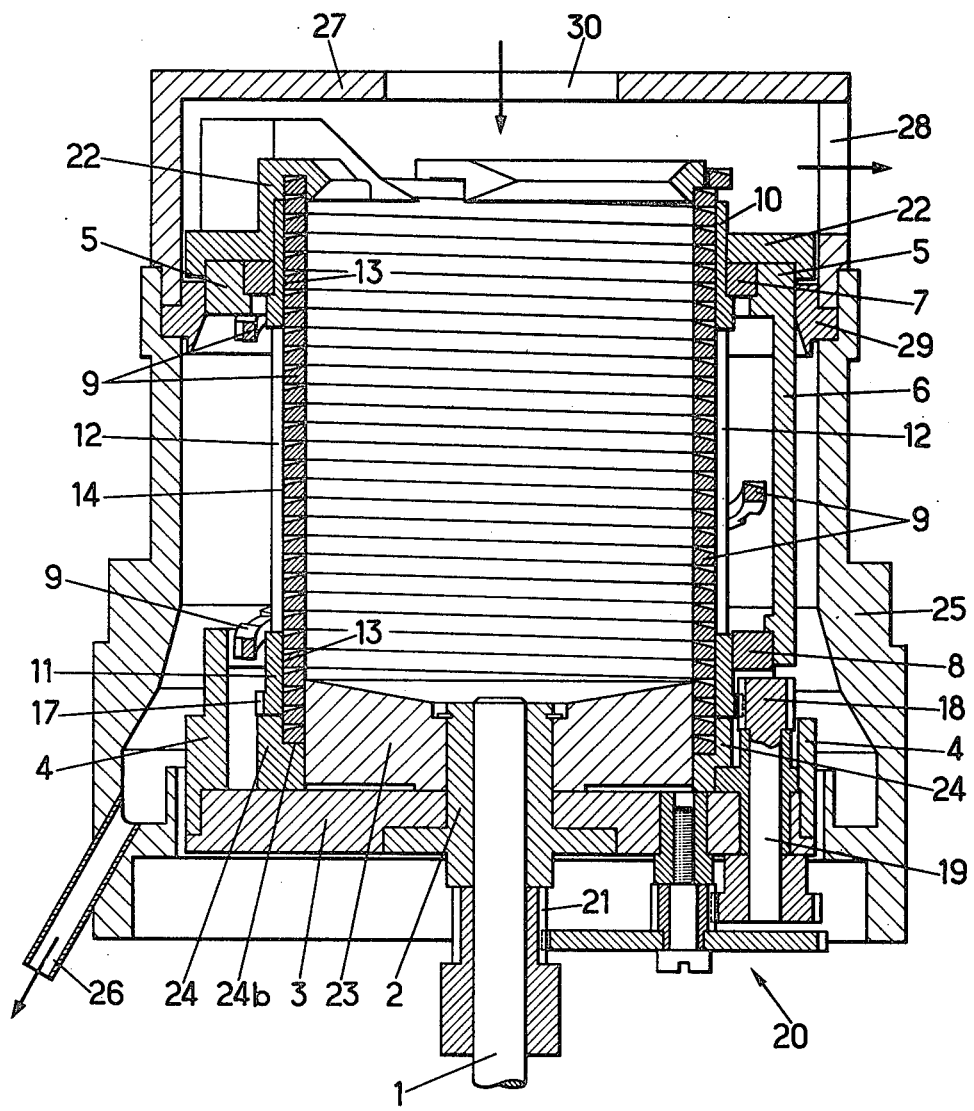
FIG. 1 is an axial section of the apparatus.

FIG. 1 shows the drive shaft 1, supported on bearings, not shown, and driven by a motor, not shown. This shaft is preferably vertical, but it could also have any other orientation, since the centrifugal force plays a predominant part, while on the contrary, gravity plays only a very secondary part. The upper end of the shaft 1 is integral with a boss 2 which in turn is integral with a plate 3 supporting a cylindrical wall which is pierced so as to allow only one lower rim 4 to subsist whose base is integral with the periphery of the plate 3, an upper rim 5 and narrow members 6, for example, three in number, connecting the two rims. All of the above pieces thus rotate with the shaft 1 in a rigid assembly constituting the first cage.

Figure 4:
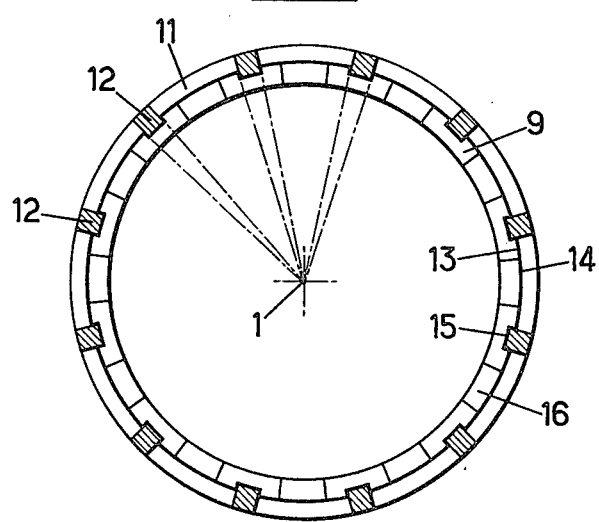
FIG. 4 is a horizontal section of the gear cage.

In the above cage, an upper drumhead 7 and a lower drumhead 8 are mounted, which are made of anti-friction material and are both pierced or notched in an appropriate place of their circumference to allow passage of the return loop of the endless belt 9. In the drumheads 7 and 8, the second cage is journaled, which comprises another cylindrical sleeve having lateral rectangular apertures to allow only one continuous upper rim 10 and a continuous lower rim 11 to subsist which are connected by bars 12 projecting toward the inside of a common inner cylindrical surface 13 of the two rims 10 and 11, as shown in particular in FIG. 4.

The belt 9, shown in all the Figures and particularly in FIG. 5, has a quadrangular cross-section, that is, rectangular or preferably square, with equidistant pinions 15 on its peripheral surface 14 for engaging with the projections of the bars 12 inside the cylindrical surface 13 when the belt is rolled up in helicoidal form with adjoining turns inside the second cage with its surface 14 facing the surface 13 of the cage. Further, the belt comprises, on one of its surfaces perpendicular to the surface 14, for example in its upper surface, notches 16 widening toward the outside for providing, in a known manner, uncloggable filtration orifices in the above helicoidal winding, the notches 16 being intercalated with the pinions 15.

The profile of the portion of the bars 12 projecting into the inside of the surface 13, and consequently the profile of the pinions 15, may be any gearing profile, but preferably trapezoidal profiles whose lateral planes converge toward the axis of the assembly. In this way, when the temperature varies, for example, for application to a coffee machine, and when the belt has an expansion coefficient which is very different from that of the cage, as is generally the case when the belt is made of a plastic material and the cage of metal, the expansions and contractions of the helicoidal winding assembly contained in the drive cage cause deformation by similar orientation of the winding. This causes the belts to slide on the bars with the plane lateral converging surfaces while continuing to insure rigorous centering of the belt assembly. The cage must be dimensioned for the maximum temperature permitted to the belt or so that under cold conditions, a sufficient play is provided between the surfaces 13 and 14 on the one hand, and between the tops of the projections of the bars 12 and the bottom of the pinions 15 on the other hand. Because of this arrangement, the return loop of the belt expands only on its own account without having to be subjected to the accumulated expansions of the numerous turns of the winding having adjacent turns inside the drive cage.

In order to insure a slow rotational drive of the drive cage 10, 11, 12 in relation to the supporting cage 1 to 8, an outer gear 17 is provided at the base of the rim 11. Engaged with this gear is a pinion 18 whose axle 19 turns in the plate 3 in an appropriate bearing by being entrained in slow rotation by an appropriate reducer 20 disposed under the plate 3, starting from a central pinion 21 coaxial with the shaft 1 and which may be stationary, or immobilizable on command. This makes it possible, in the known manner, by freeing the pinion 21 to stop the axial progressive movement of the endless belt without, however, arresting the rotational movement of the assembly.

Figure 3:
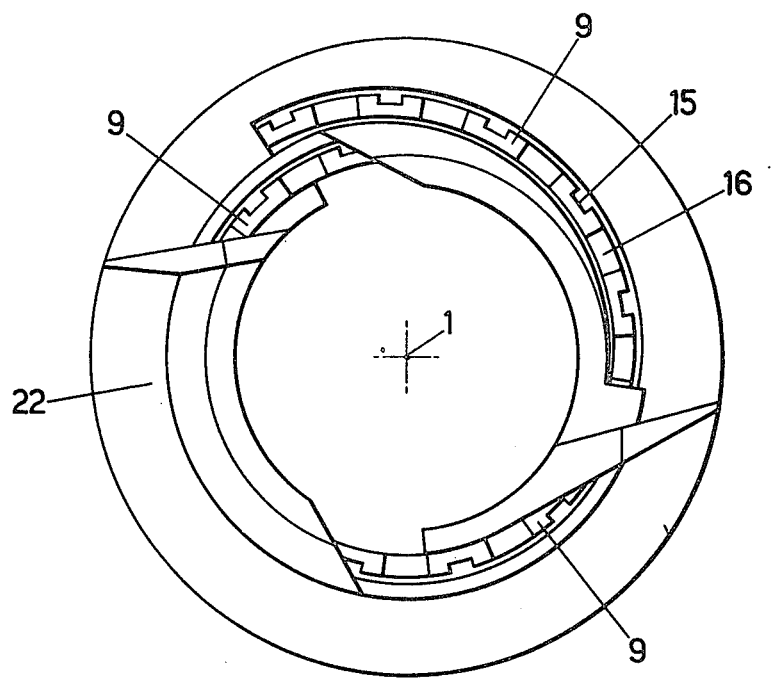
FIG. 3 is a top view of said rotating part.

As described above, the first cage is the one which comprises the stationary progressive guides for unwinding and rewinding the belt. For this purpose, the upper end of the rim 5 of the first cage comprises a member 22 which can advantageously be made of molded material. It has, as will be seen particularly in FIGS. 1 and 3, a particular shape which allows it to fit onto the upper turn of the winding with adjacent turns of the belt and to guide it progressively toward the outside so that it clears the upper edge of the rim 10. Thereafter, the belt moves progressively downwardly in order to pass through a spiroidal notch provided in the member 22, then into the above-indicated notch of the number 7 and eventually a notch in the rim 5, thus, continuously feeding the free return coil of the belt 9 which extends, in one or several turns, down to the lower end of the apparatus passing through to the outside of the drive cage. The same shaped member 22 may advantageously comprise devices for scraping the belt as well as guide slots and deflectors for solid products which are driven toward the exterior by the centrifugal force.

Figure 6:
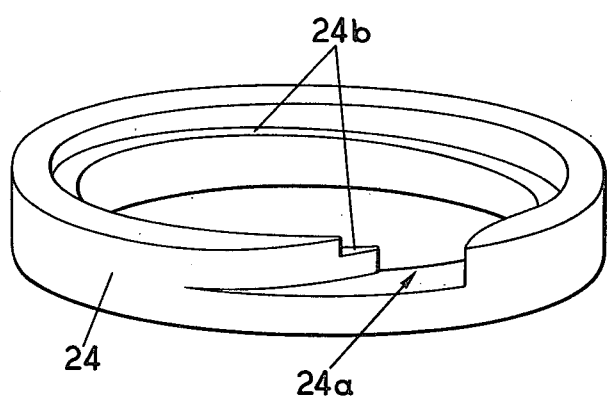
FIG. 6 is a perspective view of the lower guide member.

On the lower side, a rotating cylindrical base wall 23 is preferably provided which idles about an extension of the shaft 1 or of the boss 2 above the plate 3 and whose outer cylindrical surface corresponds exactly to the minimum inside diameter of the winding of the belt 9. Another shaped member 24 is further provided which is secured above the plate 3 and which can also be made of molded material. This member has a shape, shown in particular in the cutaway of FIG. 2 and in FIG. 6, which makes it possible to guide the lower side of the belt so that, after having moved around the toothed rim 17 and the lower edge of the rim 11 of the drive cage, it moves spirally toward the center until it winds up in adjacent turns on the cylindrical surface of the rotating base 23, just below the preceding turn, passing through the opening 24a.

Such progressive and continuous winding of a new turn at each revolution below the existing turns, the base of which slides constantly supported on the helicoidal ramp 24b, produces a slow vertical ascending movement of the assembly of turns in relation to the rotating base 23 on the one hand, and also in relation to the drive cage, the lower end of the bars 12 being preferably shaped to insure their automatic recentering on the pinions 15 while the belt advances between the parts 23 and 11 and before it leaves the member 23.

Such movement of the belt therefore proceeds without any horizontal friction, neither on the base 23 which, it will be remembered, is loose, nor on the drive cage, but only a slow vertical sliding between the side surfaces of the bars and the side surfaces of the pinions 15. The only horizontal sliding occurs in the shaped guide members 22 and 24.

Apart from the questions of expansion dealt with above, it is clear that this type of support, of guiding and of driving with the aid of a single driving member has a considerable advantage in relation to the drive described above by rotating peripheral rollers. In fact, in this case, not only is the gear mechanism greatly simplified, but above all the bars 12 which no longer require an individual bearing, may be much more numerous without placing a strain on the cost of the apparatus, and they can be extremely rigid without having to undergo alternate rotative deflection. Thus, not only is the mechanism much simpler to manufacture, but it is also much more robust and much more rigid because it is made in a single block and is also much better centered which allows it to turn without vibration and without deterioration at much higher centrifugal speeds.

The assembly is of course disposed in a stationary casing whose base 25 collects the liquid centrifuged component which is evacuated at 26, and an upper part 27 with an orifice 28 for evacuating the solid products, a joint 29 being disposed between the two in order to bear on the upper part of the rim 5, while an upper orifice 30 serves to introduce the products.

The uses of the separator are innumerable since the apparatus can serve for screening or sifting one or several pulverulent products in dry condition, or for filtering and centrifugally separating a liquid containing solid particles, such as, for example, the centrifugal filters which are of interest for the sugar-producing industry or the fruit juice centrifuges. It is also possible to insure washing or rinsing of solid products by a solvent introduced separately into the apparatus, or the extraction of an active constituent or an aromatic contained in the solid products, also with a liquid solvent. This category comprises in particular, the use in continuously operating and automatically cleaning coffee machines such as already contemplated in the above mentioned French patent.

In the diversity of these uses, it will be remembered that the rotational axis of the apparatus may be either vertical or in any other direction, that the rotational speed can be varied optionally depending on the desired result, and that the axial advancing movement of the endless belt may be established or interrupted at will without interrupting the rotation of the assembly.

I claim:

1. In a continuously renewing separator with a rotating cylindrical wall of the type comprising a helicoidal winding with closely adjacent turns of an endless belt which is looped about itself so as to unwind slowly at one end and rewind at the other end while advancing axially at the same time as it is drawn into continuous rotation at a greater speed than the axial advancement, the belt being disposed for this purpose in a rotating first cage turning at the greater speed and comprising on the one hand a device for supporting and guiding the cylindrical wall having adjoining turns and including progressive unwinding and rewinding guides located fixedly in said cage, with a slow and continuous drive means for moving the belt in relation to said cage, the improvement wherein said supporting and guiding device, as well as said drive means are constituted at the same time by a second cylindrical cage coaxial with the first cage and comprising equidistant bars which are integral with two continuous terminal drumheads and which project inside said drumheads, and wherein said belt comprises exterior notches cooperating with the projecting portion of said bars to insure engagement, said second cage being driven at a speed which is slightly different from that of the first cage.

2. The separator, in accordance with claim 1, wherein said first cage comprising the progressive unwinding and rewinding guides is integral with a rotational shaft through the intermediary of a plate which closes those of its ends through which filtering commences, while said second cage is in the shape of a sleeve which is open at both ends and which turns in the first one by means of notched bearing rings, said second cage comprising at its end close to said plate, an outer gear on which a pinion engages whose axle turns in said plate by being driven from a planetary immobile or immobilizable pinion by means of a reducer which is integral with said plate.

3. The separator, in accordance with claim 2, further comprising above said plate closing said first cage a circular bottom on the circular periphery of which the belt guided by the rewinding guide is wound in adjoining turns, before the belt comes to fit axially on said bars, the progressive unwinding and rewinding guides supported by said first cage being shaped so as to progressably deform the belt in order to cause it to pass outside the drive cage and in the space between the two cages.

4. The separator, in accordance with claim 3, wherein said belt has a quadrangular cross-section with three smooth surfaces and one surface in contact with the adjacent turn comprising notches widening toward the inside and intercalated with said pinions.

* * * * *